(12) United States Patent
Rei et al.

(10) Patent No.: US 7,833,402 B2
(45) Date of Patent: Nov. 16, 2010

(54) POROUS CATALYST STRUCTURE AND ITS MANUFACTURING METHOD

(75) Inventors: Min Hon Rei, Tao Yuan (TW); Shih Chung Chen, Tao Yuan (TW); Yu Ling Kao, Tao Yuan (TW); Chia Yeh Hung, Tao Yuan (TW)

(73) Assignee: Green Hydrotec Inc., Tao Yuan (TW)

( * ) Notice: Subject to any disclaimer, the term of this patent is extended or adjusted under 35 U.S.C. 154(b) by 17 days.

(21) Appl. No.: 12/154,563

(22) Filed: May 23, 2008

(65) Prior Publication Data

US 2009/0008258 A1    Jan. 8, 2009

Related U.S. Application Data

(60) Provisional application No. 60/941,165, filed on May 31, 2007.

(30) Foreign Application Priority Data

Mar. 19, 2008  (TW) ............................... 97109738 A (51) Int. Cl.
*B01J 23/70* (2006.01)
*C25D 5/10* (2006.01)

(52) U.S. Cl. ................ 205/177; 502/325; 502/232; 502/337; 502/345; 205/170; 205/261

(58) Field of Classification Search ............ 205/170, 205/177, 261–263; 502/340, 343, 345, 349, 502/337, 339, 325, 350, 353, 232
See application file for complete search history.

(56) References Cited

U.S. PATENT DOCUMENTS 4,187,200 A    2/1980 Jenkin
4,417,000 A *  11/1983 Slaugh et al. ............... 518/713
4,743,577 A *  5/1988 Schroeder et al. ........... 502/326
5,380,696 A *  1/1995 Sawada et al. .............. 502/313
6,149,877 A    11/2000 Ogai (Continued)

FOREIGN PATENT DOCUMENTS

JP    05-213681 A    8/1993

(Continued)

OTHER PUBLICATIONS

Meng, C.Y., "Study on Preparing Pd/Porous Stainless-Steel Composite Membranes by Electroless Plating," *Master 's Thesis, Hebei University of Technology*, 2006.

*Primary Examiner*—Stuart Hendrickson
*Assistant Examiner*—Richard M Rump
(74) *Attorney, Agent, or Firm*—Patterson Thuente Christensen Pedersen, P.A.

(57) ABSTRACT

A porous catalyst structure with a high specific surface area comprising a porous substrate with a catalyst layer thereon is provided. The porous catalyst structure can be prepared by a process comprising depositing a metallic layer onto the surface of a porous, metallic substrate by electroplating, and optionally oxidizing the metallic layer into the metal oxide layer. Any conductive porous metallic substrate can be used as the substrate of the subject invention, and the metallic layer may comprise any suitable metal(s) and/or metal oxide(s) with desired catalytic function(s).

10 Claims, 7 Drawing Sheets
(2 of 7 Drawing Sheet(s) Filed in Color)

U.S. PATENT DOCUMENTS

| | | |
|---|---|---|
| 6,183,545 B1 * | 2/2001 | Okuhama et al. .......... 106/1.18 |
| 6,479,428 B1 | 11/2002 | Tonkovich et al. |
| 2002/0106527 A1 * | 8/2002 | Schmidt ..................... 428/557 |
| 2003/0170160 A1 | 9/2003 | Morita et al. |
| 2006/0292340 A1 | 12/2006 | Ohno et al. |
| 2007/0102300 A1 * | 5/2007 | Dai ........................... 205/205 |

FOREIGN PATENT DOCUMENTS

| | | |
|---|---|---|
| JP | 10-263416 A | 10/1998 |
| JP | 2003-245547 A | 9/2003 |

* cited by examiner

POROUS CATALYST STRUCTURE AND ITS MANUFACTURING METHOD

This application claims priority to the provisional patent US 60/941,165 filed on May 31, 2007.

CROSS-REFERENCES TO RELATED APPLICATIONS

Not applicable.

BACKGROUND OF THE INVENTION

1. Field of the Invention

This invention provides a porous catalyst structure with a high specific surface area that comprises a porous metallic substrate and a metallic catalyst layer on the surface of the substrate. More particularly, this invention provides a porous structure in which the metallic catalyst layer comprises a copper-zinc oxide (CuOZnO) and the catalyst substrate comprises a porous stainless steel, wherein the catalyst layer may optionally comprise $Al_2O_3$, $ZrO_2$, or a combination thereof.

2. Descriptions of the Related Art

Catalysts are materials that help to improve the reaction rate when participating in a reaction, but will not be consumed in the reaction. For example, when used for exhaust gas treatment, the catalyst may allow deleterious gas molecules in the exhaust gas to be converted at a low temperature by decreasing the activation energy necessary for the gas decomposition reaction. Specifically, catalysts typically enable the desired reaction to proceed by decreasing the activation energy of the reaction, thus improving possibilities of occurrence of the reaction.

Presently, a wide variety of inorganic metallic oxides catalysts have been developed, which are generally produced by preparing granules of active metal oxides and then conglutinating the granules together. However, for typical reactions involving a solid catalyst, the catalyzed reaction usually occurs on the surface of the catalyst. Hence, if the reactants fail to enter the catalyst, the utilization factor of the catalyst will be degraded remarkably, which implies waste of both the reaction volume and materials. Moreover, most of the common metal oxides are all insulating materials with poor thermal conductivity, which restricts and adversely impacts the performance of the catalyst in a heated reaction.

To improve the performance of conventional solid catalysts, a cellular substrate with a high specific surface area has been adopted in some prior art solutions to support a catalyst to enlarge the contact area between the catalyst and the reactants. As an example, in a catalyst structure disclosed in JP5213681, a fiber-reinforced cellular ceramic substrate is formed by mixing a ceramic material with a high specific surface area, inorganic fibers and an inorganic adhesive together, molding or extruding the mixture, and then calcining the molded piece.

In the aforesaid cellular catalyst, the performance of the catalyst may be improved by increasing the specific surface area of the substrate, reducing the particle size of the catalyst components and improving the distribution pattern of the catalyst components. However, if more substrate (usually made of ceramic aluminum oxides) is added to increase the specific surface area, the ceramic material will become thicker without improving the contact area. For this reason, various improvements on the cellular substrate structure (e.g., the cellular form, density, wall thickness or the like) have been proposed, for example, in JP10-263416.

JP2003-245547 also discloses a cellular catalyst structure adapted for treating exhaust gas such as low-concentration carbon monoxide (CO). In this structure, the cellular substrate is also prepared by extruding a material with a high specific surface area and then calcining the extruded piece. The thickness of the partition walls between the individual penetrating holes, the length of the walls in the gas flow direction and the opening area ratio of the cellular structure are all controlled within specific ranges. Additionally, US 2006/0292340 discloses another cellular catalyst structure, in which a plurality of parallel through-holes partitioned by a plurality of partitions are formed on the substrate to increase the surface area of the substrate.

A commercialized product of cellular catalyst structures is the Diesel Three-Way Catalyst (DTWC) manufactured by PHITECS, in which a cellular catalyst substrate with 400 cells per square inch (CPSI) is used.

The cellular substrate structures enlarge the contact area between the active catalyst component distributed on the substrate surface and the reactants primarily by molding or extruding a ceramic material into the cellular form. Unfortunately, since such cellular catalyst substrates have huge volumes and weights, they suffer from some limitations in application. For example, it is difficult to weld the cellular catalyst to the reactor. Meanwhile, poor adhesion between the ceramic material and metallic catalysts (e.g., selected from a group consisting of Pd, Pt and other similar metals) can decrease the endurance of these catalysts.

Currently, another kind of cellular catalyst that uses a metallic material as a substrate has emerged in the market, for example, a metallic cellular catalyst produced by REEcat (web site: www.reecat.com). Generally, such metallic cellular catalysts are prepared in the following way. A wavy metal sheet is worked and rolled up into a cellular cylindraceous substrate. Then, a ceramic material (e.g., an aluminum oxide, a silicon oxide or the like) is coated onto the substrate through an immersion plating process to form a thin ceramic layer, and subsequently, a metal or metal oxide material functioning as an active catalyst is coated onto the thin ceramic layer. Finally, the assembly is subjected to a drying and calcining procedure to complete the cellular catalyst. This may improve the thermal conductivity of the catalyst and the gaseous kinetics of the reactants in the apertures of the catalyst, thus preventing pressure loss.

However, as being limited by the forming process, the aforementioned metallic cellular catalyst is formed thereon with a limited density of apertures (usually no more than 100 CPSI), which also imposes a limitation on the extent to which the surface area may be increased. Meanwhile, since such a structure is formed by processing and rolling up a wavy metal sheet into a cellular cylindraceous substrate, most of the reactants (e.g. deleterious gas) will reside within the full-through cylindraceous substrate, causing inadequate contact with the catalyst molecules during reaction. Furthermore, such a catalyst structure also has poor adhesion between the ceramic material and the metallic catalyst.

In view of the aforesaid problems, this invention provides a catalyst substrate with a high specific surface area, good thermal conductivity and stable adhesion without even occupying a large space to provide a porous catalyst structure demonstrating superior catalytic performance and applicability.

SUMMARY OF THE INVENTION

One objective of this invention is to provide a porous catalyst structure with a high specific surface area, comprising:

a porous metallic substrate; and a metallic catalyst layer on the surface of the porous metallic substrate.

Another objective of this invention is to provide a method for manufacturing a porous catalyst structure with a high specific surface area, comprising:

providing a porous metallic substrate; and electroplating a metallic catalyst layer on the surface of the porous metallic substrate.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The patent or application file contains at least one drawing executed in color. Copies of this patent with color drawing(s) will be provided by the Patent and Trademark Office upon request and payment of the necessary fee.

DESCRIPTION OF THE PREFERRED EMBODIMENT

The porous catalyst structure with a high specific surface area of the invention comprises a porous metallic substrate and a metallic catalyst layer on the surface of the porous metallic substrate. The porous metallic substrate may be made of any appropriate porous conductive metal materials, but is preferably made of an iron alloy such as stainless steel.

Any metallic catalyst component With the desired function may be used in the porous catalyst structure of the invention. In general, the metallic catalyst layer comprises a catalyst component, depending on the particular use or requirements of the porous catalyst structure. The catalyst component may be a metal, a metal alloy, an oxide of a metal, an oxide of a metal alloy, or a combination thereof. Preferably, the catalyst component is selected from a group consisting of Cu, Zn, Mg, Al, Zr, Ni, Pt, Co, Rh, Ru, Re, Ti, Pd, alloys of two or more aforementioned metals, oxides of any of the aforementioned metals or alloys, or combinations thereof. Preferably, the catalyst component should be a metal alloy, an oxide of a metal, oxide of a metal alloy, or a combination thereof.

According to one embodiment of this invention, the catalyst component is selected from a group consisting of copper alloys, Cu-containing oxides, or combinations thereof. When used in a methanol steam reforming reaction, the metallic catalyst layer preferably adopts a copper-zinc alloy, a copper-zinc oxide (CuOZnO), or a combination thereof as a catalyst component, and more preferably, adopts a copper-zinc oxide as a catalyst component. In another embodiment, when used for the treatment of an exhaust gas such as that from a motorcycle or an automobile, the metallic catalyst component may be selected from a group consisting of Pd, Rh, Pt, and combinations thereof. In this case, because the engine of a motor cycle works at a relatively low temperature (about 500 to 650° C.) and usually lacks maintenance, the exhaust gas emitted therefrom comprises also carbon monoxide and unburned oil vapor in addition to carbon dioxide and water steam. Therefore, a catalyst comprising Pt and Pd may be adopted in motorcycle vent-pipe to oxidize the carbon monoxide and oil vapor into carbon dioxide and water to avoid air pollution. On the other hand, because the engine of an automobile works at a relatively high temperature (about 600 to 750° C.) and is usually well-maintained, the exhaust gas emitted therefrom comprises less oil vapor, but the relatively high operating temperature results in the additional emission of nitrogen oxides (NOx). To remove such exhaust gases, an alloy of Pt, Pd and Rh may be used as an appropriate catalyst, wherein the use of the metal Rh may reduce the nitrogen oxides into nitrogen under the assistance of the oil vapor. The cellular structure increases the distribution area of the catalyst to facilitate the contact of the exhaust gas with the catalyst and accomplish the desired reaction rapidly.

Furthermore, to improve the catalytic performance, extend the applicable scope of the catalyst structure and increase the reaction area, an additive may be added to the metallic catalyst layer of the porous catalyst structure. For example, the additive may be selected from a group consisting of ceramic powder (e.g., aluminum oxide, silicon oxide, zirconium oxide, niobium oxide, titanium oxide, and combinations thereof), graphite, Teflon, diamond, fibers, and combinations thereof. Generally, when such an additive exists in the metallic catalyst layer, the concentration thereof ranges from 10 wt % to 40 wt % and preferably from 15 wt % to 25 wt % on the basis of the total amount of the metallic catalyst layer.

The use of the additive may increase the specific surface area of the metallic catalyst layer and consequently increase the probabilities for reactants to contact the catalyst component. Additionally, when an additive with an acidic catalysis such as aluminum oxides, silicon oxides and aluminum-silicon composite oxide is used, the acidity that it demonstrates above 400° C. can be comparable to that of concentrated sulfuric acid (but is neither corrosive, nor will it cause problems related to safety or environment protection), which may her extend the applicable scope and improve the catalytic performance of the catalyst.

The metallic catalyst layer is formed on the surface of the porous metallic substrate. It should be noted that the term "surface" as used herein includes both the surface of the porous metallic substrate and the walls of apertures formed on the surface. The thickness of the metallic catalyst layer is determined on the premise that it shall not close all the apertures of the porous metallic substrate. On the other hand, because the catalytic reaction relies on the contact between the catalyst component and the reactants, the metallic catalyst layer needs not to be very thick. Otherwise, the catalyst component beneath the catalyst layer surface would fail to come into contact with the reactants, thus causing material waste. The metallic catalyst layer is generally formed to a thickness ranging from 0.5 μm to 20 μm, preferably from 0.5 μm to 10 μm, and more preferably from 0.5 μm to 5 μm. The use of a catalyst layer with all appropriate thickness may not only prevent the catalyst material from being wasted, but can also maintain the porosity of the porous metallic substrate and consequently the preferable gas flow rate (which can be seen from a flow rate test described hereinafter).

The porous catalyst structure may optionally comprise a nascent film between the porous metallic substrate and the metallic catalyst layer. Use of the nascent film may enhance the adhesion strength between the metallic catalyst layer and the porous metal substrate to prevent peeling and prolong service life of the porous catalyst structure. Typically, the nascent film may comprise a material selected from a group consisting of Ni, Cu, Ag, Au, alloys of the aforesaid metals, and combinations thereof. Preferably, the nascent film comprises Ni. Additionally, compared to the metallic catalyst layer, the nascent film is thinner in thickness, to avoid impact on the porosity of the porous metallic substrate. For instance, the thickness of the nascent film is preferably controlled to range from 0.2 μm to 1 μm.

In the porous catalyst structure of this invention, a porous metallic material is used as a substrate to support the catalyst component. Because the porous metallic material conducts heat much faster than conventional ceramic materials, it is advantageous for the reaction to occur with an improved heat conductive efficiency and consequently at an increased reaction rate. Furthermore, the good electric conductivity of the used porous metallic substrate may induce the electric current to flow through sites where active catalysts exist, thus rendering electrocatalytic reactions feasible.

Furthermore, as described above, the metallic catalyst layer in the porous catalyst structure of this invention not only covers the surface of the porous metallic substrate, but also covers the walls of the apertures formed in the surface. Consequently, apart from increasing the contact area between the catalyst component and the reactants, this may also save the materials and increase the volume compactness of the structure. That is, it is unnecessary to increase the overall volume of the metallic substrate to increase the contact area.

The porous catalyst structure of this invention may be prepared through a simple electroplating process. Specifically, this may be accomplished by performing an electroplating process on a porous metallic substrate made of stainless steel for example, so that a metallic layer is plated on the porous metallic substrate as a catalyst layer. Prior to the electroplating process, pre-processes such as degreasing, acid pickling or the like may be optionally carried out to facilitate the plating of the metallic catalyst layer. For instance, commercially available porous metallic substrates are typically stained with oil, which is disadvantageous for electroplating.

To eliminate the adverse effect caused by the oil stain, an organic solvent such as toluene or acetone may generally be used to degrease and clean the oil stain of the porous metallic substrates. In addition, an HCl aqueous solution from 3N to 7N for example may be used to clean the porous metallic substrate to remove the oxide film formed during the preparation or sintering of the metallic substrate and activate the substrate surface.

Subsequent to the aforementioned optional processes such as degreasing and acid pickling, an electroplating process is carried out to form a metallic plated layer on the surface of the porous metallic substrate for use as the catalyst layer. This metallic layer may be plated through any appropriate electroplating processes currently available, for example, spin plating, barrel plating or rack plating. Additionally, compositions of the electroplating solution, amount of electric current, process temperature or operating parameters of the like may be adjusted depending on the type (e.g., a monometallic layer or a metal alloy layer) and species of the metal to be plated, dimensions of the metallic substrate and other factors.

Generally, the electroplating solution contains a metal salt, a complexing agent (e.g., tartrate) and a buffering agent (e.g., hydroxide). Compared to electroplating a single metal material, electroplating two or more metal materials simultaneously requires more factors to be considered; one of which is the reduction potential difference between different species. For example, in the copper-zinc alloy catalyst layer, it is difficult for them to be co-deposited in a common solution because the two metals have a reduction potential difference of more than 1 volt (V) ($Cu^{2+}/Cu=0.336$ V; $Zn^{2+}/Zn=-0.768$ V). In solutions of prior art, such a layer is electroplated in a cyanide-containing electroplating solution (since in an alkaline cyanide electroplating solution, the reduction potential levels of the copper and zinc become close to each other: $Cu^{2+}/Cu=-1.165$ V; $Zn^{2+}/Zn=-1.227$ V). However, cyanide is a kind of administratively regulated toxic material which is harmful to the environment and people's health. Therefore, the copper-zinc alloy catalyst layer should be electroplated preferably using a tartrate system, for example, using an electroplating solution containing copper sulfate, zinc sulfate, potassium sodium tartrate and sodium hydroxide.

The electroplating process is typically carried out under a current density ranging from 10 to 70 $mA/cm^2$, preferably ranging from 15 to 60 $mA/cm^2$, with the electroplating solution typically controlled to a temperature ranging from 25° C. to 60° C., and preferably ranging from 30° C. to 40° C.

Additionally, if a metallic catalyst layer comprising the aforesaid additive is to be prepared, the additive and the catalyst component may be co-electroplated onto the porous metallic substrate through a co-electroplating process. For instance, during the previously described electroplating process, the powder of the additive (e.g., alumina) may be added and suspended in the electroplating solution by mechanical stirring operations or by adding a suspending agent, and is adsorbed onto the surface of the substrate by Van der Waals. In this way, the additive particles are incorporated into the plated metallic catalyst layer. To suspend the additive particles without affecting the electroplating effect of the catalyst component, the particulate additives (e.g., ceramic power, graphite, Teflon and diamond) with a particle size generally ranging from 0.5 μm to 10 μm are usually used.

Depending on the purpose of the prepared catalyst structure (especially when used for steam reforming reactions), when a metal oxide layer is desired for use as the catalyst layer, an oxidizing process may be further performed after a plated metallic layer is formed on the surface of the porous metallic substrate by the electroplating process to oxidize the plated metallic layer into a metal oxide layer for use as the catalyst layer. For instance, the porous metallic substrate plated with a metallic layer and optionally an additive, may be put into a heated atmosphere and remained therein at an elevated temperature for a period of time (e.g., when oxidizing a copper-zinc alloy layer, the temperature may be increased to 300° C. to 400° C. for 2 to 3 hours by feeding hot air) to form a layer of catalytic metal oxide and the optional additive on the substrate surface. Thus, the desired porous catalyst structure is provided.

To improve the adhesion strength between the substrate and the catalytic layer and to enhance the strength of the structure, a nascent film (e.g., a Ni layer) may optionally be formed on the porous metallic substrate prior to the electroplating process. For example, in case a porous stainless steel substrate is used, a Ni layer may be pre-plated at first before the metallic layer is electroplated. Additionally, in this pre-plating step, the thickness of the pre-plated layer may be controlled within an appropriate range (e.g., from 0.2 μm to 1 μm) by adjusting the electroplating conditions such as the amount of electric current and temperature to maintain the porosity of the receptor (i.e., the porous metallic substrate).

For nascent film plating technologies, reference may be made to an article authored by Renouprez, 1 J. F. et al in *Journal of Catalysis*, 170 (1997, p. 181), an article authored by Seung-Eun Nam et al in *Journal of Membrane Science*, 153 (1999, p. 163), an article authored by Seung-Eun Nam et al in *Journal of Membrane Science*, 170 (2000, p. 91), and an article authored by Seung-Fun Nam et al in *Journal of Membrane Science*, 192 (2001, p. 177), all of which are incorporated herein by reference in their entirety.

Accordingly, this invention may increase the contact area between the catalyst and the reactants by forming a metallic catalyst layer on the porous metallic substrate (including the surface of apertures therein) through an electroplating process. The metallic catalyst layer may be controlled within a range from 0.5 μm to 20 μm in thickness to prevent wasted materials and present a high gas flow rate, thus improving the overall performance of the porous catalyst structure. Furthermore, the good adhesion between the plated catalyst layer formed by electroplating and the porous metallic substrate may eliminate peeling and prolong the service life of the porous catalyst structure.

Hereinafter, this invention will be further illustrated with reference to working examples thereof.

Example 1

Electroplating of a Copper-Zinc Alloy Layer (Pre-Processing of Porous Stainless Steel)

Figure 1:
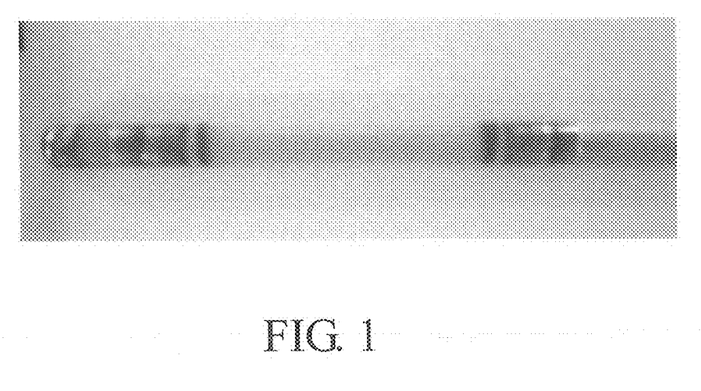
FIG. 1 is an image of the surface of a porous stainless steel (PSS) filter pipe subsequent after a welding procedure.

A commercially available stainless steel (No. 316) filter pipe manufactured by Mott Corp. in America (website: http://www.mottcorp.com/) is used. The pipe has an outer diameter of 10.0 mm, an inner diameter of 6 mm, a filter class of 0.2 μm and an aperture size of about 0.2 μm (some relatively large pits sized 50 to 100 μm may exist on the surface). The stainless steel filter pipe is cut into a segment of 75 mm in length, which is then connected with a common stainless steel pipe (having an outer diameter of 10.0 mm and a length of 40 mm) by welding. Then the combined pipe has a distal end thereof closed to form the stainless steel pipe as shown in FIG. 1.

(Pre-Plating of Ni)

Subsequently, with a Pt-coated Ti mesh as an anode, and in an aqueous electroplating solution containing 250 g/l of nickel sulfate, 45 g/l of nickel chloride and 30 g/l of boric acid, a pre-plating process is performed at a solution temperature of 40° C. to 50° C. and under a current density of 50 mA/cm$^2$ for 10 minutes. As a result, a nickel layer is plated on the pre-processed stainless steel pipe to a thickness about 0.5 μm to 1.0 μm.

(Electroplating of Copper-Zinc Alloy)

Figure 2:
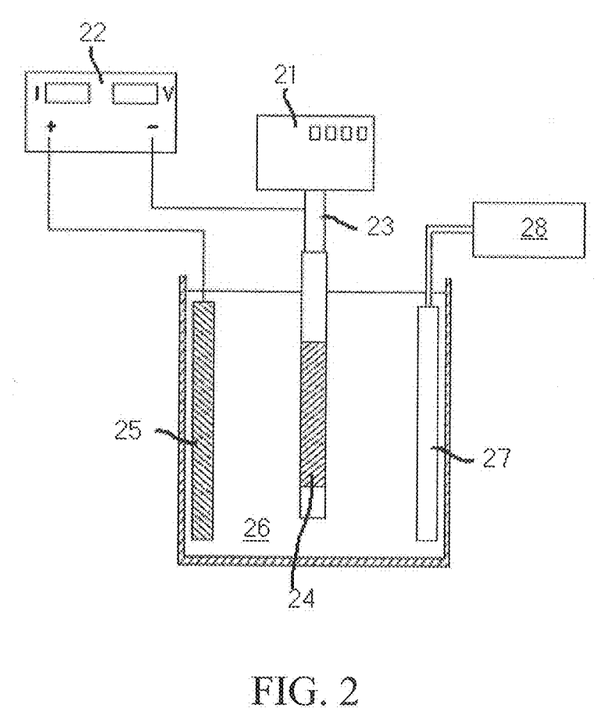
FIG. 2 is a schematic view of the electroplating equipment used in an embodiment of this invention.

Afterwards, an electroplating process is performed by use of a rotary columnar electrode (EG&G 636) system 21 and a power supply 22 as shown in FIG. 2. The pre-plated stainless substrate 24 is connected to a rotary columnar electrode 23 connected with a cathode of the power supply 22 and is kept at a rotation speed of 10 rpm. A piece of copper-zinc alloy is used as an anode 25 to supplement copper and zinc ions consumed in the electroplating solution 26. Meanwhile, a porous air stone 27 connected with an air agitator 28 is also disposed in the electroplating bath to feed air for air agitation to keep a homogeneous solution. Under the same electroplating conditions as the nickel pre-plating process, an electroplating process is performed in an electroplating solution containing 30 μl of copper sulfate, 12 g/l of zinc sulfate, 100 g/l of potassium sodium tartrate and 45 g/l of sodium hydroxide for 30 minutes. As a result, a copper-zinc alloy layer of 15 μm in thickness and 3.8 cm$^3$ in volume (=7.5×3.1416(1.0$^2$−0.6$^2$)/4) is obtained.

(Analysis on Appearance and Compositions of Electroplated Alloy Layer)

Figure 3:
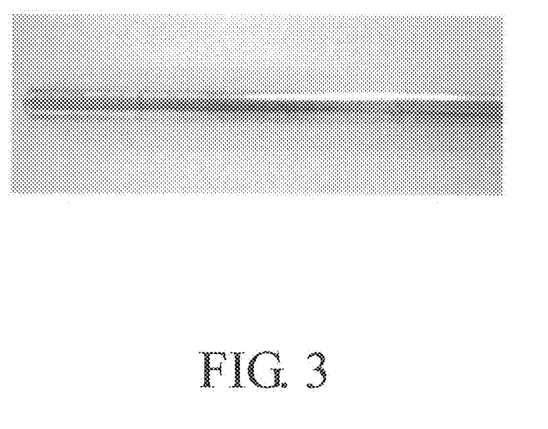
FIG. 3 shows a PSS filter pipe electroplated with a copper-zinc alloy.
Figure 4:
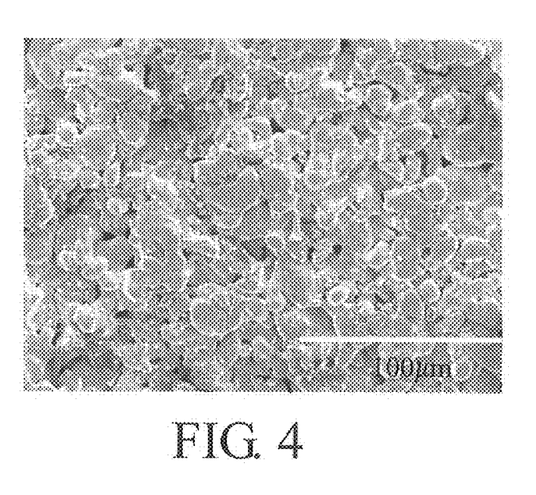
FIG. 4 is an SEM picture (500 times enlarged) of the surface of a PSS filter pipe before electroplating.
Figure 5:
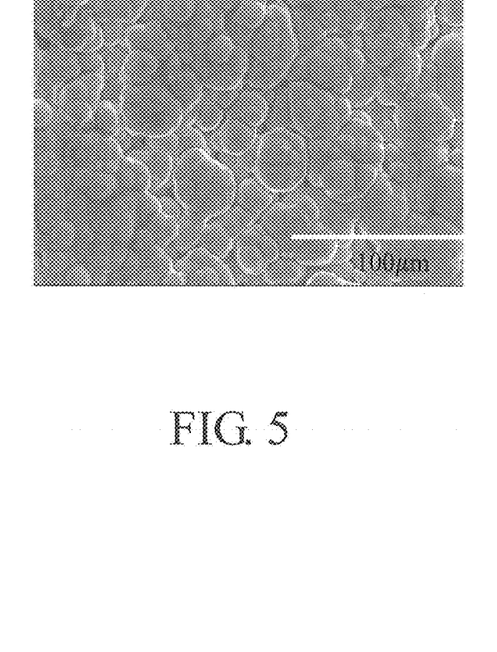
FIG. 5 is an SEM picture (500 times enlarged) of the surface of a PSS filter pipe electroplated with a copper-zinc alloy.

Finally, the electroplated stainless filter pipe is immersed into acetone and cleaned by an ultrasonic oscillator for 5 minutes. Then, the pipe is taken out and dried to obtain a stainless steel filter pipe plated with a copper-zinc alloy layer. An appearance of the resulting stainless steel filter pipe is shown in FIG. 3. FIG. 4 and FIG. 5 are scanning electron microscopic (SEMs) pictures of the porous stainless steel prior to and subsequent to the electroplating process respectively.

Figure 6:
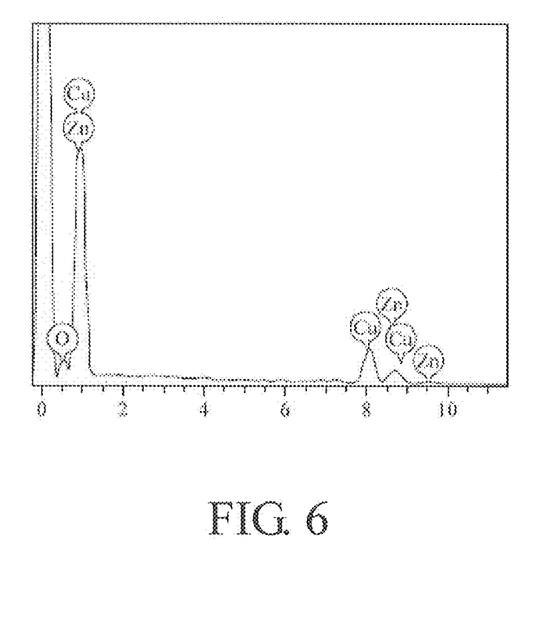
FIG. 6 shows the EDS analysis that results on the copper-zinc alloy layer of the PSS filter pipe in FIG. 5, where the k-axis represents energy-level potential (kev) and the Y-axis represents the energy strength.
Figure 7:
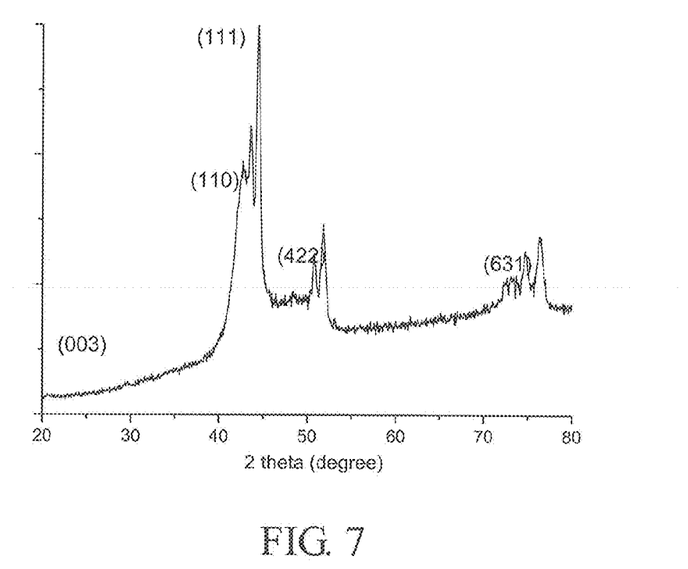
FIG. 7 shows the ultimate analysis results measured by XRD on the copper-zinc alloy layer of the PSS filter pipe in FIG. 5, where the k-axis represents 2θ (θ is the angle of incidence) and the Y axis represents the diffractive wave strength.

Then, an analysis is made on the compositions of the resulting copper-zinc layer by using an energy-dispersive spectrometer (EDS) and through X-ray diffraction (XRD) analysis, with the results shown in FIG. 6 and FIG. 7 respectively. As the results reveal, copper and zinc have deposited on the porous stainless steel substrate while the resulting copper-zinc layer is of an alloy phase ($Cu_6Zn_4$).

Example 2

Electroplating of a Copper-Zinc Alloy Layer

In this embodiment, the same method and materials as those of the Embodiment 1 are used, except that the concentrations of copper ions and zinc ions in the electroplating solution are altered to electroplate a copper-zinc alloy layer of a $Cu_5Zn_5$ phase on the stainless steel substrate.

Figure 8:
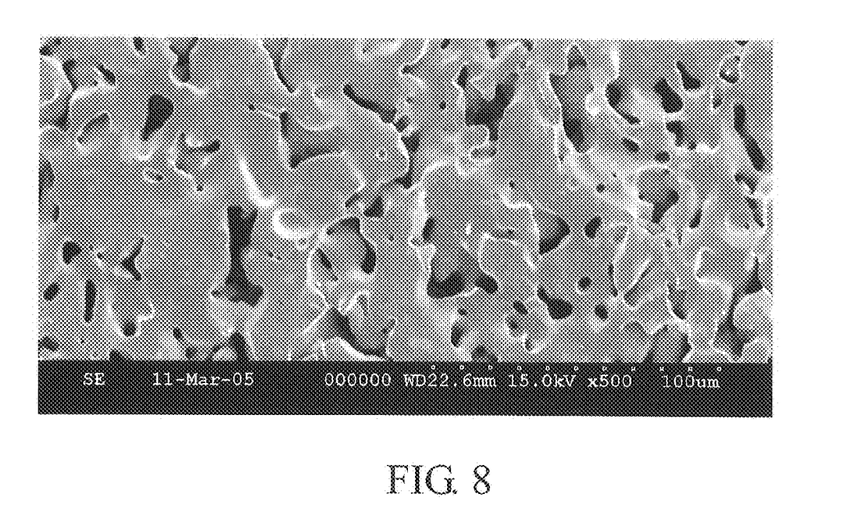
FIG. 8 is an SEM picture (500 times enlarged) of a metallic annular cross-section of a PSS filter pipe before electroplating.
Figure 9:
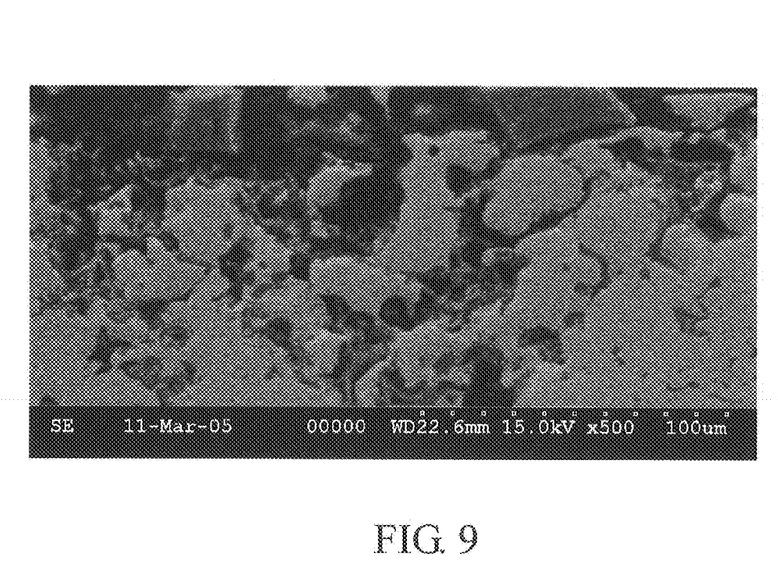
FIG. 9 is an SEM picture (500 times enlarged) of a metallic annular cross-section of a PSS filter pipe electroplated with a copper-zinc alloy (in a $Cu_5Zn_5$ phase)

Additionally, a stainless steel filter pipe that is not electroplated and an electroplated stainless steel filter pipe obtained in this embodiment are cut off in a direction perpendicular to respective central axes. Then, SEM pictures are taken on the annular metal cross-sections thereof, as shown in FIG. 8 (not electroplated) and FIG. 9 (electroplated) respectively. FIG. 8 shows the porous structure of the porous stainless steel filter pipe prior to the electroplating process. FIG. 9 reveals that the copper-zinc alloy layer is plated on the walls of apertures in the porous stainless steel without closing these apertures, which means that the specific surface area of the catalyst structure is improved while the gas flow rate is still maintained (see Embodiment 3).

Example 3

Gas Flow Rate Test

Figure 10:
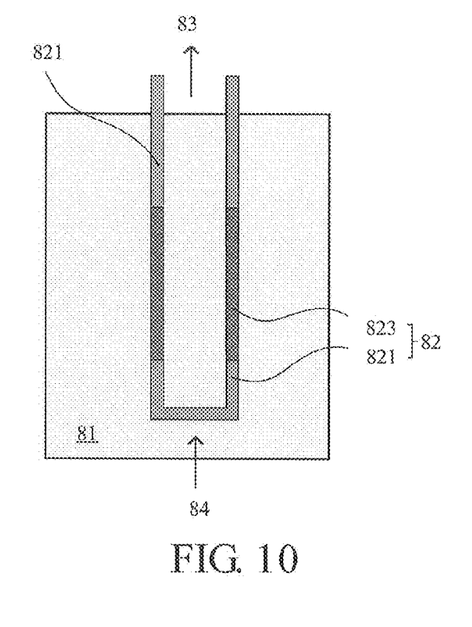
FIG. 10 is a schematic cross-sectional view of a gas flow rate measurement apparatus.

An apparatus shown in FIG. 10 is used to test the gas flow rates of the stainless steel filter pipes 82 plated with a copper-zinc alloy layer obtained in Embodiment 1 and Embodiment 2. FIG. 10 is a cross-sectional view taken along the central axis direction of the apparatus. The stainless steel filter pipes not electroplated with a copper-zinc alloy layer in Embodiment 1 and Embodiment 2 are put into a hollow tubular body 81 with an inlet 84 and an outlet that is optionally opened and closed (not shown). In the subject test, helium at a pressure of 2 gf/cm² is directed into the hollow tubular body 81 through the bottom inlet 84, and a gas flow rate is measured at the outlet 83 of the filter pipe 82 (i.e., the test is made with the hollow tubular body 81 being closed). Furthermore, this test is repeated on the stainless steel filter pipes 82 (with porous segments 823 at the central portion and a common (relatively compact) portion 821 at both ends) obtained in Embodiment 1 and Embodiment 2 respectively, with the results shown in Table 1.

TABLE 1

| Flow rate (liter/minute) | Prior to electroplating | Electroplated with copper-zinc alloy layer |
|---|---|---|
| Embodiment 1 | 15.9 | 14.8 |
| Embodiment 2 | 15.5 | 14.5 |

It can be seen from Table 1 that the gas flow rates of the porous stainless steel filter pipes deposited with a copper-zinc alloy layer have no significant difference from those of the filter pipes that are not electroplated. This shows that the metal alloy layer deposited by electroplating according to the method of this invention doesn't inappropriately obstruct the porosities in the porous metallic substrate and still maintains a desired contact area.

Example 4

Metal Oxide Layer

The porous stainless steel filter pipe electroplated with a copper-zinc alloy layer obtained in Embodiment 1 is put into a jacket reactor with an inner diameter of 25 mm, and air is directed into the space between the filter pipe and the Jacket. A temperature of 350° C. is maintained for 2.5 hours to oxidize the copper-zinc alloy into a CuOZnO layer. The resulting metal oxide layer is called CuB-1 in brief.

Then, these steps are repeated on the porous stainless steel filter pipe electroplated with a copper-zinc alloy layer obtained in Embodiment 2, and the resulting metal oxide layer is called CuB-2 in brief.

Example 5

Multi-Component Catalyst Layer

Figure 11:
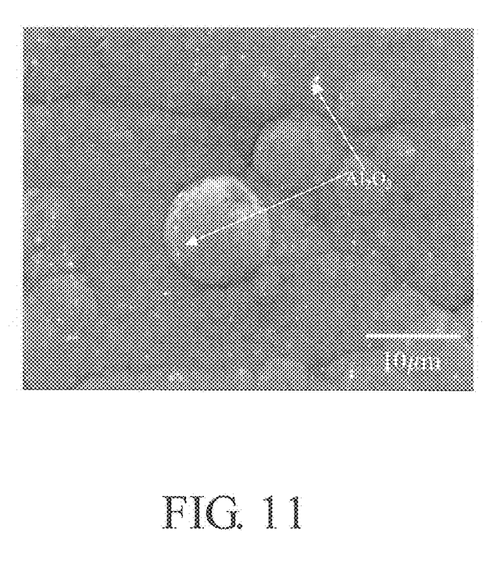
FIG. 11 is an SEM picture (3500 times enlarged; with an aluminum oxide concentration of 10 g/l)) of the surface of a PSS filter pipe electroplated with a copper-zinc alloy/aluminum oxide ($CuZnAl_2O_3$) layer.
Figure 12:
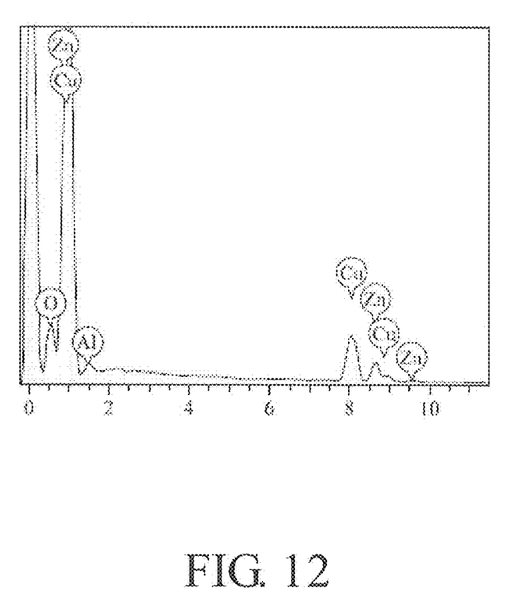
FIG. 12 shows EDS analysis results on the copper-zinc alloy/aluminum oxide layer of the PSS filter pipe in FIG. 11.

The pre-processing and nickel pre-plating procedures described in Embodiment 1 are repeated, and then during the copper-zinc alloy electroplating process, aluminum oxide is added into the electroplating solution of Embodiment 1 in an amount of 10 g/l to co-electroplate the copper-zinc alloy and aluminum oxide ($Cu_6Zn_4/Al_2O_3$) onto the porous stainless steel filter pipe for 20 minutes. An electroplated layer about 10 μm in thickness is obtained. An SEM picture and an EDX analysis diagram of the resulting $Cu_6Zn_4/Al_2O_3$ layer are shown in FIG. 11 and FIG. 12 respectively, which reveals that the aluminum oxide particles are well-distributed in the copper-zinc alloy layer.

Figure 13:
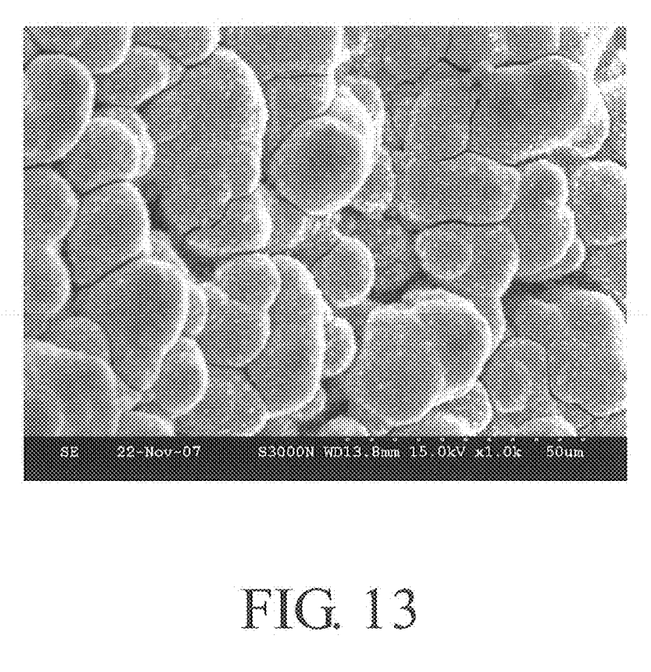
FIG. 13 is an SEM picture (1000 times enlarged; with an aluminum oxide concentration of 20 g/l)) of a PSS filter pipe electroplated with a copper-zinc alloy/aluminum oxide ($CuZnAl_2O_3$) layer.

These steps are repeated except that the aluminum oxide (20 g/l) is added into the electroplating solution of Embodiment 1 during the copper-zinc alloy electroplating process. An SEM picture of the resulting copper-zinc alloy/aluminum oxide layer is shown in FIG. 13. Table 2 shows the ultimate analysis results on the copper-zinc alloy/aluminum oxide layers corresponding to the aluminum oxide concentrations of 10 g/l and 20 g/l respectively.

TABLE 2

| Elements | aluminum oxide in a concentration of 10 g/l | | aluminum oxide in a concentration of 20 g/l | |
|---|---|---|---|---|
| | wt % | at %[1] | wt % | at % |
| O | 11.23 | 32.34 | 29.69 | 53.65 |
| Al | 4.06 | 6.92 | 23.64 | 25.33 |
| Cu | 51.63 | 37.42 | 29.91 | 13.61 |
| Zn | 33.08 | 23.31 | 16.76 | 7.41 |
| Total amount | 100.00 | | 100.00 | |

[1]atomic number percentage

It can be seen from Table 2 that when the content of aluminum oxide in the electroplating solution increases, the content of aluminum oxide in the resulting electroplated layer will also increase accordingly.

Then, the stainless steel filter pipe electroplated with the copper-zinc alloy/aluminum oxide layer obtained using an aluminum oxide concentration of 20 g/l is put into a jacket reactor with an inner diameter of 25 mm. The air is directed into a space between the filter pipe and the Jacket. A temperature of 350° C. is maintained for 2.5 hours to oxidize the copper-zinc alloy into a CuOZnO layer. The resulting metallic catalyst layer is called Cu20A-1 in brief.

Then, these procedures are repeated except that during the copper-zinc alloy electroplating process, the aluminum oxide is added into the electroplating solution of Embodiment 2 in a concentration of 20 g/l. The resulting metallic catalyst layer is called Cu20A-2 in brief.

Example 6

Multi-Component Catalyst Layer

The steps of Embodiment 5 are repeated except that during the copper-zinc alloy electroplating process, the aluminum oxide is added into the electroplating solution of Embodiment 1 in a concentration of 40 g/l. The resulting metallic catalyst layer is called Cu40A-1 in brief.

Furthermore, the steps of Embodiment 5 are repeated except that during the copper-zinc alloy electroplating process, the aluminum oxide is added into the electroplating solution of Embodiment 2 in a concentration of 40 g/l. The resulting metallic catalyst layer is called Cu40A-2 in brief.

Example 7

Multi-Component Catalyst Layer

The steps of Embodiment 5 are repeated except that during the copper-zinc alloy electroplating process, zirconium oxide is added into the electroplating solution of Embodiment 1 in a concentration of 20 µl. The resulting metallic catalyst layer is called Cu20Z-1 in brief.

Furthermore, the steps of Embodiment 5 are repeated except that during the copper-zinc alloy electroplating process, zirconium oxide is added into the electroplating solution of Embodiment 2 in a concentration of 20 µl. The resulting metallic catalyst layer is called Cu20Z-2 in brief.

Example 8

Multi-Component Catalyst Layer

The steps of Embodiment 5 are repeated except that during the copper-zinc alloy electroplating process, niobium oxide is added into the electroplating solution of Embodiment 1 in a concentration of 20 g/l. The resulting metallic catalyst layer is called Cu20N-1 in brief.

Example 9

Steam Reforming Reaction

The stainless steel filter pipes with various catalyst layers obtained in Embodiments 4 to 8 are put into the hollow tubular body 81 shown in FIG. 10 (in a cross-sectional view) to obtain a jacket reactor. Then at the flow rate of 0.35 cc/min, 0.7 cc/minor 1.7 cc/min, i.e., at a volumetric hourly space velocity (VHSV) of 4350 $hr^{-1}$, 8700 $hr^{-1}$ or 10600 $hr^{-1}$, a mixture of methanol and water (methanol/water=1.1) is fed via the inlet 84 into the space between the filter pipe 82 and the hollow tubular body 81, while the reaction temperature is set at 350° C. to allow the methanol steam reforming reaction to occur. The reaction product obtained from the outlet 83 comprises hydrogen ($H_2$), carbon monoxide (CO) and carbon dioxide ($CO_2$). Results of the reforming reaction are presented in Table 3.

TABLE 3

| Catalyst | VHSV, $hr^{-1}$ | % mol conversion | % mol selectivity $H_2$ | CO | $CO_2$ |
|---|---|---|---|---|---|
| CuB-1 | 10600 | 7.3 | 76.1 | 17.2 | 6.7 |
| CuB-2 | 8700 | 3.3 | 70.38 | 23 | 6.52 |
| Cu20A-1 | 8700 | 44.4 | 68.6 | 19.2 | 11.6 |
| Cu20A-2 | 4350 | 57.6 | 69.8 | 16.8 | 12.8 |
| Cu40A-1 | 8700 | 15.6 | 70.4 | 22.7 | 6.7 |
| Cu40A-2 | 4350 | 22.0 | 68.2 | 22.7 | 9.0 |
| Cu20Z-1 | 8700 | 37.1 | 67.0 | 9.3 | 18.5 |
| Cu20Z-2 | 4350 | 61.1 | 66.6 | 8.4 | 18.9 |
| Cu20N-1 | 8700 | 1.3 | 69.3 | 23 | 7.6 |

Table 3 reveals that the catalyst structure of this invention may surely catalyze the desired reaction and the metallic catalyst layer of this structure surely provides the desired performance. Furthermore, by adding an appropriate additive into the metallic catalyst layer, the performance of the metallic catalyst for use in methanol steam reforming reactions is effectively improved and the selectivity with respect to toxic CO is decreased.

Due to the porosity of the porous catalyst structure, the catalyst of this invention has a considerably high specific surface area. Therefore, the catalyst of this invention can utilize a smaller volume to provide a relatively large reaction area, to achieve a miniaturized catalyst, which would otherwise be impossible for conventional cellular catalyst structures. Accordingly, this invention improves the performance, size and conductivity thereof.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for manufacturing a porous catalyst structure, the method comprising:
   providing a porous metallic substrate; and
   electroplating a metallic catalyst layer on the surface of the porous metallic substrate,
   wherein an electroplating solution is used in the electroplating step and the electroplating solution comprises an additive selected from a group consisting of ceramic powder, graphite, polytetrafluoroethylene, diamond, fibers, and combinations thereof.

2. The method as claimed in claim 1, wherein the porous metallic substrate is a stainless steel substrate, and the electroplating step comprises electroplating a metallic catalyst layer on the surface of the stainless steel substrate.

3. The method as claimed in claim 1, wherein an electroplating solution is used in the electroplating step and comprises one or more metals selected from a group consisting of Cu, Zn, Mg, Al, Zr, Ni, Pt, Co, Rh, Ru, Re, Ti, and Pd.

4. The method as claimed in claim 3, wherein an electroplating solution comprising two or more metals is used in the electroplating step.

5. The method as claimed in claim 4, wherein an electroplating solution comprising copper and zinc is used in the electroplating step.

6. The method as claimed in claim 4, wherein an electroplating solution comprising tartrate is used in the electroplating step.

7. The method as claimed in claim 3, wherein the additive is ceramic powder selected from a group consisting of aluminum oxide powder, silicon oxide powder, zirconium oxide powder, niobium oxide powder, titanium oxide powder, and combinations thereof.

8. The method as claimed in claim 1, wherein the ceramic powder is selected from a group consisting of aluminum oxide powder, silicon oxide powder, zirconium oxide powder, niobium oxide powder, titanium oxide powder, and combinations thereof.

9. The method as claimed in claim 1, further comprising an oxidizing step for oxidizing the metallic catalyst layer after the electroplating step.

10. The method as claimed in claim 1, comprising forming a nascent film on the porous metallic substrate prior to the electroplating step, wherein the nascent film comprises a material selected from a group consisting of Ni, Cu, Ag, Au, alloys of the aforementioned metals, and combinations thereof.

* * * * *